(No Model.)
C. KEHR.
TIRE.
No. 517,418.  Patented Mar. 27, 1894.
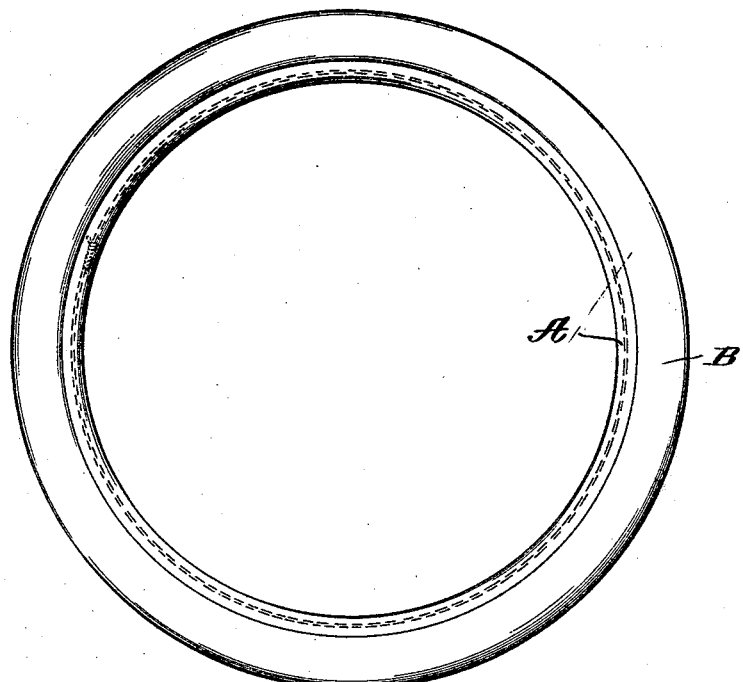
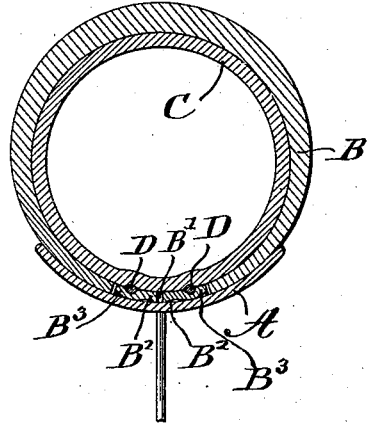
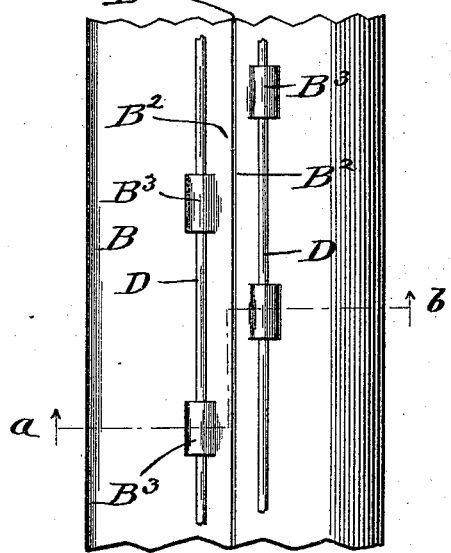
Inventor:
Cyrus Kehr
Witnesses:

UNITED STATES PATENT OFFICE.

CYRUS KEHR, OF LAKE SIDE, ILLINOIS.

TIRE.

SPECIFICATION forming part of Letters Patent No. 517,418, dated March 27, 1894.

Application filed July 6, 1893. Serial No. 479,707. (No model.)

*To all whom it may concern:*

Be it known that I, CYRUS KEHR, a citizen of the United States, residing at Lake Side, in the county of Cook and State of Illinois, have invented certain new and useful Improvements in Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This improvement relates particularly to pneumatic or similar tires in which the outer tube is open along a line extending along the middle of the seat or portion which rests in the rim of the wheel.

The object of the invention is to produce such a tire provided with efficient and convenient means for holding its edges together along said opening.

In the accompanying drawings:—Figure 1 is a side view of a tire embodying my invention. Fig. 2 is a section in the line $a$—$b$ of Fig. 3. Fig. 3 is a view of the tread of the tire.

In said drawings, A is the rim.

B is the outer tube of the tire, and C is the inner tube of the tire. Said inner tube is to be air tight and may be of any well known form. The tube, B, is of relatively strong construction, as is usual with the construction of the outer tube of pneumatic tires.

Along a line extending along the middle of the seat or portion lying in the rim, A, the tube, B, is open, as indicated at B', all around the tire, in order that the tube, C, may be readily inserted and removed and in order that access may be had to said tube, C, at any point of the circumference of the tire. The edges, $B^2$, of the tube, B, along said opening are adapted to meet closely. Said tube, B, may be manufactured by entirely surrounding an annular mandrel with sheet rubber and then placing the mandrel and rubber surrounding it into a mold and there pressing and vulcanizing and then removing the mandrel and tube surrounding the mandrel from the mold and slitting said tube all around the interior of the mandrel.

$B^3$ designates tongues of any desired shape formed by cutting through the tube, B, along each side of the opening, B', the base of said tongue being toward said opening. A binder, D, extends around the tire at each side of and substantially parallel to said opening, and over the outside of the portions of the wall of the tube, B, between said tongues and beneath said tongues and against the bases of the latter. When the tire is in place upon the rim, A, the meeting ends of the binders, D, are united by twisting or otherwise and thereby tightly drawn so that they will engage said tongues and draw said edges, B', toward each other and tightly against the rim. The free ends of the tongues will, when pressure is applied, bend into the spaces from which they were cut. The binders, D, may be put into place beneath the tongues, $B^3$, when the tire is in place upon the rim or when it is off, as may be preferred. It will be seen that this means of fastening may be applied to the tube, B, without forming the latter of any special shape along the tread. All of the tread, and indeed the entire wall of the tube, may be of uniform thickness. This simplifies the work of building up the tube upon the mandrel and molding it.

I claim as my invention—

1. The combination with the tube, B, open along a line extending along the middle of the seat and having tongues, $B^3$, formed from the wall of said tube and having their bases toward said tube, of binders extending around said tire at each side of and parallel to said opening and lying outside of the portions of the wall of said tube between said tongues and lying beneath said tongues, substantially as described.

2. The combination with the tube, B, open along a line extending along the middle of the seat and having tongues, $B^3$, formed from the wall of said tube and having their bases toward said tube, of binders extending around said tire at each side of and parallel to said opening and lying outside of the portions of the wall of the tube between said tongues and lying beneath said tongues, and a rim, A, substantially as described.

In testimony whereof I affix my signature in presence of two witnesses, this 29th day of June, 1893.

CYRUS KEHR.

Witnesses:
ALICE LINEE,
AMBROSE RISDON.